United States Patent [19]
Oishi

[11] Patent Number: 6,154,841
[45] Date of Patent: Nov. 28, 2000

[54] DIGITAL SIGNATURE METHOD AND COMMUNICATION SYSTEM

[75] Inventor: Kazuomi Oishi, Yokohama, Japan

[73] Assignee: Canon Kabushiki Kaisha, Tokyo, Japan

[21] Appl. No.: 08/845,405

[22] Filed: Apr. 25, 1997

[30] Foreign Application Priority Data

Apr. 26, 1996 [JP] Japan .................................. 8-108225
Apr. 26, 1996 [JP] Japan .................................. 8-108226

[51] Int. Cl.$^7$ ......................................................... H04L 9/00
[52] U.S. Cl. .................................................. 713/180; 380/59
[58] Field of Search ................................... 380/25, 23, 24, 380/28, 29, 30, 44, 45, 46, 59; 713/180, 200, 168, 150

[56] References Cited

U.S. PATENT DOCUMENTS

| | | | |
|---|---|---|---|
| 4,759,063 | 7/1988 | Chaum ....................................... | 380/30 |
| 4,947,430 | 8/1990 | Chaum ....................................... | 380/25 |
| 5,493,614 | 2/1996 | Chaum ....................................... | 380/30 |
| 5,537,475 | 7/1996 | Micali ........................................ | 380/30 |
| 5,600,725 | 2/1997 | Rueppel et al. .......................... | 380/30 |

OTHER PUBLICATIONS

M. Mambo and Eiji Okamoto, "A Method to Publicly Specify a Signer With Hiding Identity," The 18th Symposium on Information Theory and its Applications, Oct. 1995.
R.L. Rivest, A. Shamir and L. Adleman, "A Method of Obtaining Digital Signatures and Public Key Cryptosystems," Communications of ACM, vol. 21, No. 2, pp. 120–126, 1978.
T.E. ElGamal, "A Public Key Cryptosystem and a Signature Scheme Based on Discrete Logarithms," IEEE Transactions on Information Theory, vol. IT–31, No. 4, pp. 469–472, 1985.
A. Fiat and A. Shamir, "How to Prove Yourself; Practical Solutions of Identification and Signature Problems," Proc. of CRYPTO '86, 1987.
C.P. Schnorr, "Efficient Signature Generation by Smart Cards," Journal of Cryptology, vol. 4, pp. 161–174, 1991.
Bruce Schneier, "Applied Cryptography: Protocols, Algorithms, and Source Code in C," John Wiley and Sons, Inc. (2nd edition).
D. Chaum and E. van Heyst, "Group Signatures," Proc. of EUROCRYPT '91, pp. 257–265 (1991).
S.J. Park, I.S. Lee and D.H. Won, "A Practical Group Signature," Proc. of the 1995 Japan–Korea Workshop on Information Security and Cryptology, IV–3.00127, pp. 127–133 (1995).
I.B. Damgard, "Practical and Provably Secure Release of a Secret and Exchange of a Signature," Proc. of EUROCRYPT '93, pp. 207–217 (1994).

*Primary Examiner*—Tod R. Swann
*Assistant Examiner*—Trevor Quick Coddington
*Attorney, Agent, or Firm*—Fitzpatrick, Cella, Harper & Scinto

[57] ABSTRACT

A system for enabling verified or verifiable communications while maintaining anonymity, in which a common public parameter, such as a prime number, and a registered signature are changed, respectively, by a specifier and a signer to provide a digital signature which accompanies a message sent from the signer to a verifier.

7 Claims, 10 Drawing Sheets

FIG.12

| DIRECTORY INFORMATION |
|---|
| ⋮ |
| BASE GENERATING MODULE |
| PUBLIE KEY GENERATING MODULE |
| FIRST SIGNATURE GENERATING MODULE |
| SIGNATURE VERIFYING MODULE |
| SECOND SIGNATURE GENERATING MODULE |
| SIGNER RELEASING MODULE |
| ⋮ |
| ⋮ |
| |

DIGITAL SIGNATURE METHOD AND COMMUNICATION SYSTEM

BACKGROUND OF THE INVENTION

1. Field of the Invention

This invention relates to a digital signature method and to an information communication system.

2. Related Background Art

Computers and computer networks have recently come into wide use; and because of this they can be implemented in a manner to carry out social activity. However, in this situation, there is a problem of invasion of individual privacy.

One method for carrying out social activity while protecting privacy is that of maintaining anonymity.

By using public key cryptography, a sender can send information only to an intended receiver, and the receiver can be certain of the identity of the sender.

By using a technique known as "zero knowledge proof", it is possible for one person who has information to prove to another person that he/she has certain information while the information itself remains confidential.

An information communication system which uses such technique is described in a publication by Masahiro Mambo and Eiji Okamoto entitled "A Method to Publicly Specify a Signer With Hiding Identity", (The 18th Symposium on Information Theory and its Applications—October 1995).

In this specification, the above described information communication system is referred to as the "MO System".

Also in this specification, cryptographic techniques such as "Public Key Cryptography", "Zero Knowledge Proof", "MO System" and "Digital Signature Method" will be described below in order.

Public Key Cryptography

Public Key Cryptography is an encryption method wherein each user has an individual public encryption key, or algorithm, which is publicly available, as well as an individual secret decryption key, or algorithm, which is kept secret.

Public Key Cryptography has the following features:
(1) The public key is different from the secret key; and key delivery is easy, since there is no need to keep the public key secret;
(2) Each user's public key is open; but his own secret key is kept secret; and
(3) It is possible to realize a digital signature function which establishes that the sender is not a pretender and that the information has not been changed.

The encryption algorithm for the above mentioned public key cryptography satisfies the following two conditions (in the following conditions, the encryption process for encrypting a message M by using a public key Kp is denoted as $E(Kp, M)$; and the decryption process for decrypting the message M by using a secret key Ks is denoted as $D(Ks, M)$):

(1) The encryption process $E(Kp, M)$ can be carried out easily by the sender by using the receiver's public key Kp and the decryption process $D(Ks, M)$ can be carried out easily by the receiver by using his secret key Ks.
(2) It will be computationally difficult for anyone to decrypt a ciphertext $C=E(Kp, M)$ without the receiver's secret key Ks, even though he/she knows the receiver's public key Kp and the encryption algorithm to encrypt a message M.

It is also possible, with the above conditions (1) and (2), plus another condition (3), to carry out a secret communication:

(3) For any message M, $E(Kp, M)$ can be defined and $$D(Ks, E(Kp, M)) = M.$$

In carrying out secret communication, everyone can operate the encryption process $E(Kp, M)$, since the receiver's public key Kp has been made public. Also, only the person who knows the secret key Ks can operate the decryption process $D(Ks, E(Kp, M))$ to obtain the message M.

Furthermore, the above conditions (1) and (2) and another condition (4) will enable authentication (digital signature).

(4) For any message M, $D(Ks, M)$ can be defined and.

$$E(Kp, D(Ks, M)) = M.$$

In authentication, only the person who knows the secret key Ks can operate the decryption process $D(Ks, M)$ and obtain the result value $S=D(Ks, M)$. If someone were to try to carry out a decryption process $D(Ks, M)$ by using a false secret key Ks', or if someone were to change $S=D(Ks, M)$ to $S'=D(Ks, M)'$, the receiver would recognize that the message which the receiver received must be incorrect. This is because the receiver would check against the message M:

$$E(Kp, D(Ks', M)) \neq M;$$

and $$E(Kp, D(Ks, M)') \neq M.$$

Public key cryptography which can be used for both secret communication and authentication includes "IRSA Cryptography", which is described in a paper written by R. L. Rivest, A. Shamir and L. Adleman, entitled "A Method of Obtaining Digital Signatures and Public Key Cryptosystems", published in Communications of ACM, vol. 21, no. 2, pp. 120–26, 1978; and "ElGamal Cryptography", which is described in a paper written by T. E. ElGamal, entitled "A Public Key Cryptosystem and a Signature Scheme Based on Discrete Logarithms", published in IEEE Transactions on Information Theory, vol. IT-31, no. 4, pp. 469–72, 1985.

Public key cryptography which can be used for authentication includes the "Fiat-Shamir signature scheme," which is described in a paper written by A. Fiat and A. Shamir, entitled "How to Prove Yourself; Practical Solutions of Identification and Signature Problems," published in Proc. of CRYPTO '86, 1987; and the "Schnorr signature scheme," which is described in a paper written by C. P. Schnorr, entitled "Efficient Signature Generation by Smart Cards," published in Journal of Cryptology, vol. 4, pp. 161–174, 1991.

These techniques are also described in a book by Bruce Schneier, entitled "Applied Cryptography: Protocols, Algorithms, and Source Code in C" (second edition), published by John Wiley & Sons, Inc., which includes a broader and more detailed explanation of cryptography.

Zero Knowledge Proof

Zero Knowledge Proof means that a prover proves a proposition to a verifier under the following conditions:
(1) Completeness: If the proof is correct, the verifier accepts it with overwhelming probability, namely, nearly 100%;
(2) Soundness: If the proof is not correct, the verifier rejects it with overwhelming probability, namely, nearly 100%.
(3) Zero Knowledge: If the proof is correct, the prover does not release any information about the secret knowledge but only the correctness of the proof.

Several methods of Zero Knowledge Proof have been proposed, in which a prover having a secret can prove to a verifier that the prover knows the secret without revealing nay information about the secret. Since these methods are applied to identification and/or digital signature schemes, Zero Knowledge Proof is considered to be a basic technique in the field of information security.

MO System

The MO system, as applied in connection with the above described Public Key Cryptography and Zero Knowledge Proof, will be described with reference to FIG. 1. This MO system consists of a specifier; a plurality of users; a signer who is specified by a user; and a verifier who verifies the signature of the specified signer.

In FIG. 1, "Public Information" means common data in the system, "Public Database" means an issued database, and each arrow represents the sending, receiving and obtaining of data. Numbers enclosed in brackets represent the order of procedure.

Step 0—Preparation

The following notations and definitions are used in the specification. These notations are from elementary number theory relating to integers. Let Z be the set of integers, that is $\{\ldots,-2,-1,0,1,2,\ldots\}$, $Z_p$ be $\{0, 1, \ldots, p-1\}$, and $Z_p^*$ be the set of integers which are elements in $Z_p$ and relatively prime to p. For any integer a and any positive integer n, there are unique integers q and r such that $0 \leq r < n$ and $a = qn + r$. The value $r = a \bmod n$ is the remainder (or residue) of the division. $a \equiv b \pmod{n}$ means that (a mod n)=(b mod n). the order of $\alpha$ in $Z_p^*$ is defined as the least integer $i > 0$ such that $\alpha^i = 1 \pmod{p}$.

First, prime numbers p and q, an element a in $Z_p^*$ of order q, and a hash function h are prepared, where $q|(p-1)$ (i.e., q divides p-1), $\alpha^q = 1 \pmod{p}$, and $h: Z_p \times Z \rightarrow \{0, 1, \ldots, 2^t - 1\}$, where t is a security parameter. These numbers are registered and managed so that each user can access the numbers in a manner such that they are not changed.

A specifier i generates a public key $v_i$ and a secret key $s_i$ ($v_i = a_i^{\{-s\}} \bmod p$) and registers the public key $v_i$ into a public database. A user j, who can be a signer, generates a public key $v_j$ and a secret key $s_j$ ($v_j = a_j^{\{-s\}} \bmod p$) and registers the public key $v_j$ in the public database. A plurality of users and signers can exist in this system.

Step 1—Specifying and Making Known the User

The specifier i specifies a user, namely a signer j, from several users (denoted arrow 101 in FIG. 1) and obtains $z_j$ which is converted from the public key $v_j$ of the signer j by using a random number. The specifier i obtains a signature (signature by Schnorr signature scheme) on $z_j$ (procedure (1) in FIG. 1), and registers that signature into the public database (arrow 102 in FIG. 1).

In actuality, the specifier i selects a secret random number r from $Z_q^*$ and obtains the following parameters, by using the following equations. The specifier i then registers the signature $((y_j, e_j, x_j), z_j)$ $$x_j = a^r \bmod p;$$

$$z_j = (v_j)^r \bmod p;$$

$$e_j = h(x_j, z_j);$$

and $$y_j = r + e_j \cdot s_i \bmod p.$$

Step 2—Picking Up the Data

The user j picks up the registered signature from the database (procedure (2) and arrow 103) and confirms whether or not the signature $((y_j, e_j, x_j), z_j)$ is that of the user, by checking the following equations:

$$e_j = h(a_j^{\{y\}} \cdot (v_i)_j^{\{e\}} \bmod p, z_j) \quad (1);$$

and $$z_j = (x_j)_j^{\{-s\}} \bmod p \quad (2).$$

Any user can confirm the above equation (1). Furthermore, the signer j can confirm the above equation (2), and can recognize that the signer j has been specified by the specifier i.

On the other hand, another user $k (\neq j)$ can, by using his own key Sk, recognize that the equation (2) is not valid, because $Sk \neq Sj$. But the user k can not recognize who is specified, since the user k will not know which user's key makes equation (2) valid.

Step 3—Generation of the Signature

The signer j makes his signature on a message M based on the following formulas:

$$x1 = a_j^{\{r\}} \bmod p;$$

and $$x2 = (v_j)_j^{\{r\}} \bmod p.$$

Then the signer j obtains the following parameters e' and y as follows:

$$e' = h(x2, m);$$

and $$y = -(r_j - e')s_j \bmod q.$$

Next, the signer j sends the parameter $((y_j, e_j, x_j), z_j, (y, e', x1), m)$ as his signature to an intended person (procedure (3) and arrow 104).

Step 4—Verification of the Signature

The verifier, in the first instance, confirms the above equation (1) as well as the following equation:

$$e_j = h(z_j, a_j^{\{y\}} \cdot (v_i)_j^{\{e\}} \bmod p).$$

The verifier then confirms the following equation:

$$e' = h(m, x2)$$

$$x2 = a^y \cdot (v_j)^{\{e'\}} \bmod p \quad (3)$$

The signer j then executes Zero Knowledge Proof with the verifier for proving the following equation (procedure (5) and arrow 105 in FIG. 1):

$$\log_{xj} z_j = \log_{x1} x_2 = -S_j.$$

If the Zero Knowledge Proof is correct, the verifier can conclude that the signature on the message M was signed by the signer j.

In the above MO system, it is asserted that a specifier i specifies a signer j, and the specified signer j can generate his digital signature anonymously. In addition, the verifier who receives this signature will recognize that a signer j who was specified by the specifier i has generated the signature, but the verifier will not know the specific identity of the signer j.

Because of this feature, the MO system is especially applicable for the provision of welfare services and for audience rating investigations. In these cases, the occurrence of a request for a welfare service or the submission of an audience reaction is publicly verified by everyone. Nevertheless, the person making the welfare request or submitting the audience reaction remains anonymous. These statements are asserted in the publication by M. Mambo and E. Okamoto entitled "A Method to Publicly Specify a Signer With Hiding Identity", cited above.

Digital Signature Method

A description of the Digital Signature Method in relation to Public Key Cryptography and Zero Knowledge Proof is given in a paper entitled "Group Signatures" by D. Chaum and E. van Heyst, Proc. of EUROCRYPT '91, pp. 257–65 (1991). This method, which is referred to as "group signature", has the following features:
(1) Only members of the group can sign messages;
(2) The receiver of the signature can verify that it is a valid signature of that group, but cannot discover which member of the group made it; and
(3) In the case of a dispute later on, the signature can be "opened" (with or without the help of the group members) to reveal the identity of the signer.

The above-mentioned group signature is applicable to a bidding, or tender, system. In the tender system, the set of bidders forms a group, and each member makes a group signature on a message indicating the price, etc. The identity of the highest bidder is revealed but the remaining bidders are anonymous.

The known MO system has been subject to the following problems:
(1) The MO system requires the public key of the specified signer when a signature is verified, although the signer made the signature anonymously. That is, the anonymity of the signer is not completely preserved. Furthermore, once the verifier confirms the signature, a plurality of communications between the verifier and the signer are still required; and
(2) The MO system is based on the assumption that the system is implemented over a network which can hide the identity of a sender/receiver who has a plurality of communications. Such a network is more expensive than a simple network which can hide the identity of a sender who makes only one transmission of a message.

There are four kinds of group signature methods in the above mentioned paper by Chaum et al.; one of them requires a special authority to open a group signature and others do not; it is easy to add a new member in another of the four, while it is not in the others; and each method has the same problem, namely, that the size of the public key of a group is linear in relation to the number of members. In another group signature method, which is described in a paper entitled "A Practical Group Signature" by S. J. Park, I. S. Lee and D. H. Won, published in Proc. of the 1995 Japan-Korea Workshop on Information Security and Cryptology, IV-3.00127 and pp. 127–33 (1995), the size of the public key of a group does not grow linearly with the number of members. In this method it is easy to add new members. However, this method always requires a special authority in order to open the signature.

SUMMARY OF THE INVENTION

This invention is made in this consideration of the above circumstances; and it is an object of the invention to provide a digital signature method and information communication system which can solve the above problems.

According to one aspect of the invention, there is provided a digital signature method which comprises a first step for generating public information based on a common public parameter and an uncommon secret parameter, a second step for converting the common public parameter and the public information, a third step for making a signature based on the common public parameter, the public information, and the uncommon secret parameter, and a fourth step for confirming the relationship between the signature and the corresponding message based on the converted public information and the converted common public parameter.

According to another aspect of the invention, there is provided an information communication system which comprises a means for making or generating a digital signature based on a digital signature method and a means for confirming whether or not a signature was generated by the generating means.

According to another aspect of the invention, there is provided an information communication system which comprises a specifying means for specifying a signature generating means by means of a first signature method, a means for obtaining a base and a public key by using a second signature method, and a generating means for making or generating a digital signature by using the base and the public key based on the first signature method, wherein the digital signature proves the signature generating means which has a secret key corresponding to the public key generated by the means for obtaining the base and the public key.

According to another aspect of the invention, there is provided an information communication system which comprises a means for generating a first digital signature based on a first digital signature method, a means for generating a second digital signature by using the first digital signature based on a second digital signature method, and a means for confirming the authenticity of the second digital signature by using the first digital signature and the second digital signature.

According to another aspect of the invention, there is provided a computer readable memory having the following program codes: a first program code for generating public information based on a common public parameter and an uncommon secret parameter; a second program code for converting the common public parameter and public information; a third program code for generating a signature based on the common public parameter, the public information, and the uncommon secret parameter; and a fourth program code for confirming the relationship between the signature and the corresponding message based on the converted public information and the converted common public parameter.

According to another aspect of the invention, there is provided a computer readable memory having following program codes: a specifying program code for specifying a signature generating means by using a first signature method; a base and public key obtaining program code for obtaining a base and a public key by using a second signature method; and a digital signature generating program code for generating a digital signature by using the base and the public key based on the first signature method, wherein the digital signature proves the signature generating program code which has a secret key corresponding to the public key generated by the base and public key obtaining program code.

According to another aspect of the invention, there is provided a digital signature method which comprises a step for generating a digital signature by a group member, a step for confirming, by using a public key of the group, whether or not the digital signature has been generated by group member, and a program code for revealing a member who has generated the digital signature.

According to another aspect of the invention, there is provided a computer readable memory having the following program codes: a program code for generating a digital signature by a group member; a program code for confirming, by using a public key of the group, whether or not the digital signature was generated by group member; and a program code for revealing the member who generated the digital signature.

According to another aspect of the invention, there is provided a digital signature method in which the public key of a member comprises the result of an exponential operation with a base and the secret key of the member as an exponent. This method comprises: a first step for generating a second base by performing a first exponential operation with a first base and a random number as an exponent; a second step for generating a second public key by performing a second exponential operation with a first public key and the random number as an exponent; a third step for generating a first digital signature on a message by using the secret key of a user; and a fourth step for confirming the authenticity of the first digital signature by using the second base and the second public key.

According to another aspect of the invention, there is provided a further digital signature method in which the public key of a member comprises the result of an exponential operation with a base and the secret key of the member as an exponent. This method comprises: a first step for generating a second base by performing an exponential operation with a first base and a random number as an exponent; a second step for generating a second public key by performing an exponential operation with a first public key and the random number as an exponent; a third step for generating a first digital signature on a message by using a secret key of a user; a fourth step for confirming the authenticity of the first digital signature by using the second base and the second public key; a fifth step for generating a second digital signature corresponding to the second public key by a special user; and a sixth step for revealing a signer based on a third signature which is generated based on the first and second digital signatures.

According to another aspect of the invention, there is provided a computer readable memory having program code for information communication in which a first public key of a member is the result of an exponential operation with a first base and an exponent comprising a secret key of the member. The memory contains the following program codes: a first program code for generating a second base by performing an exponential operation with the first base and a random number as an exponent; a second program code for generating a second public key by performing an exponential operation with the first public key and the random number as an exponent; a third program code for making a first digital signature on a message by using a secret key of a user, a fourth program code for confirming the authenticity of the first digital signature by using the second base and the second public key; a fifth program code for making a second digital signature corresponding to the second public key by a special user; and a sixth program code for revealing a signer based on a third signature which is made based on the first and second digital signatures.

BRIEF DESCRIPTION OF THE DRAWINGS

FIG. 12 is a second memory map of the embodiment of FIG. 9;

DETAILED DESCRIPTION OF THE PREFERRED EMBODIMENTS

Several embodiments of this invention will be described hereinbelow with reference to the Figures.

The digital signature of the first embodiment is based on discrete logarithms. In this embodiment a secret key is not changed but a public key and the base are changed by an exponential operation which uses a random number as an exponent.

In this embodiment an ordinary (non-interactive) digital signature scheme is used, whereas a digital signature scheme based on Zero Knowledge Proof is used in the MO system.

The information communication system of this embodiment, which has above described features, is able to maintain the anonymity of a signer, since a verifier can verify the signer's signature without using the public key of the signer.

In this embodiment, the number of required communications and operations which accompany each communication can be decreased, since the verifier can verify the signature of the signer without using Zero Knowledge Proof in which a plurality of communications is needed. All that is needed is one communication to send the signer's signature to the verifier.

In addition, this system can operate in a simple and inexpensive network.

First Embodiment

Figure 2:
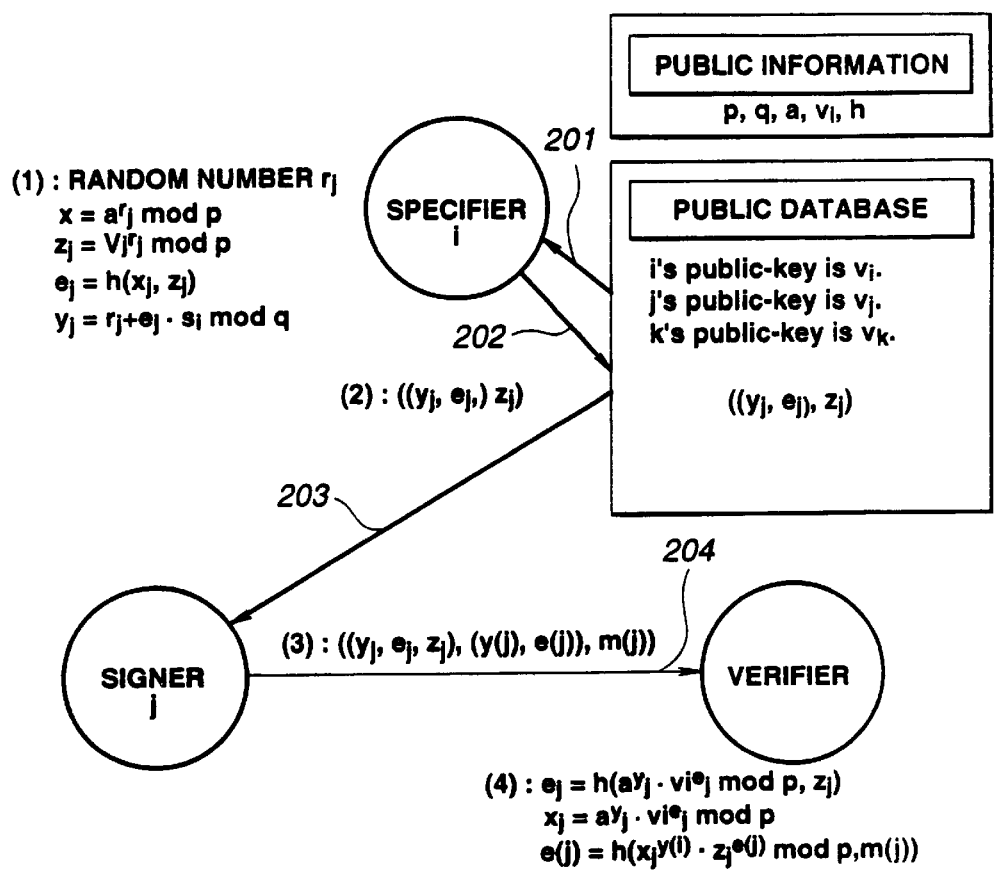
FIG. 2 is a block diagram showing an embodiment of a communication system according to the present invention.
Figure 3:
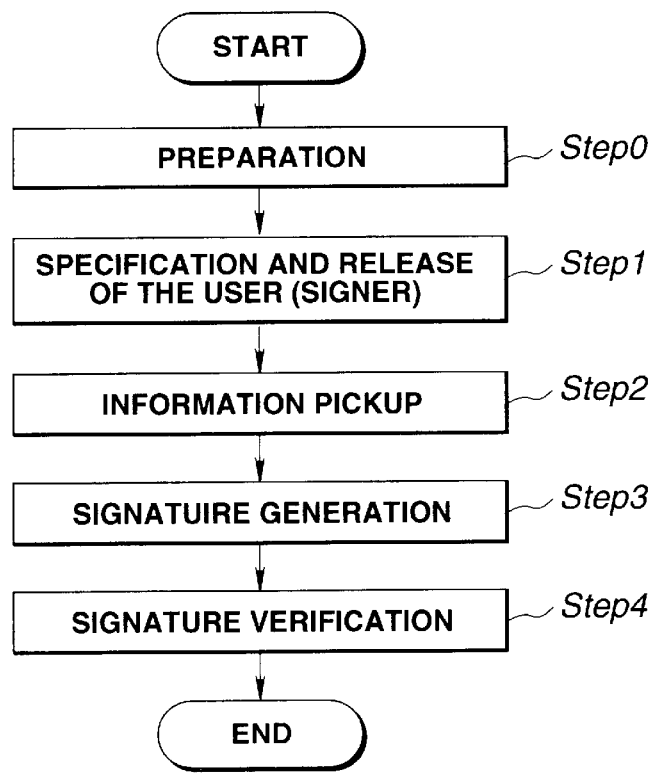
FIG. 3 is a flow chart of digital signature procedure used in the present invention.

FIG. 2 shows an information communication system as applied for carrying out a digital signature method according to a first embodiment of the invention. FIG. 3 is a flow chart which shows the operations performed in connection with the digital signature method. The first embodiment will be described with reference to FIG. 2 and FIG. 3.

Step 0—Preparation

At first, prime numbers p and q such that q|(p−1), an element a in $Z_p^*$ of order a, and a one-way hash function $h: Z_p \times Z \rightarrow \{0, \ldots, 2^{(t-1)}\}$, are prepared. These numbers, which comprise a common public parameter, are registered and managed so that every user can access them and so that they cannot be changed.

The specifier i generates a public key $v_i$ and a secret key $s_i (v_i = a_i^{\{-s\}} \mod p)$ and registers the public key $v_i$ in the public database. The user j, who can be a signer, generates a public key $v_j$ and a secret key $s_j$ ($v_j = a_j^{\{-s\}}$ mod p); and registers the public key $v_j$ into a public database. A plurality of users and signers can exist in this system.

Step 1—Specifying a User

The specifier i specifies a user (signer) j, from the several users (arrow 201 in FIG. 2); and obtains $z_j$ which is converted from the public key $v_j$ of the signer j by using a random number. The specifier then gets a signature, for example by Schnorr signature scheme (procedure (1) in FIG. 2), and registers that signature as public information into the public database (arrow 202 in FIG. 2).

More concretely, the specifier i selects a secret random number r from Zq‡ and obtains the following parameters by using the following equation, and registers the signature (($y_j$, $e_j$),$z_j$):

$$x_j = a_j^{\{r\}} \bmod p;$$

$$z_j = (v_j)_j^{\{rj\}} \bmod p;$$

$$e_j = h(x_j, z_j);$$

and $$y_j = r_j + e_j \cdot s_i \bmod p.$$

Step 2—Picking Up the Data

The user (signer) j confirms whether or not the signature (($y_j$,$e_j$),$z_j$) is for the user based on the database by checking following equations (procedure (2), arrow 203 in FIG. 2):

$$e_j = h(a_j^{\{y\}} \cdot (v_i)_j^{\{e\}} \bmod p, z_j) \quad (4);$$

and $$z_j = (a_j^{\{y\}} \cdot (v_i)_j^{\{e\}} \bmod p)_j^{\{-s\}} \bmod p \quad (5).$$

Thereafter, $a_j^{\{y\}} \cdot (v_i)_j^{\{e\}}$ mod p will be denoted as $x_j$, since the following equation is valid:

$$a_j^{\{y\}} \cdot (v_i)_j^{\{e\}} \bmod p = x_j.$$

Any user can confirm the above equation (4). Furthermore, the signer i can confirm the above equation (5); and recognize that signer i has been specified as the signer.

On the other hand, another signer can recognize that the equation (5) is not valid by using his own key. However, such other signer can not recognize who has been specified, since the other signer does not know which key of user made the equation (5) valid.

Step (3)—Generating the Signature

The signer j makes his signature on a message m(j) based on the following formulas; and the signer selects a secret random number (j) and carries out the following equations:

$$x(j) = (x_j)_j^{\{r\}} \bmod p;$$

$$e(j) = h(x(j), m(j));$$

and $$y(j) = r(j) + e(j) \cdot s_j \bmod q.$$

Next, the signer j sends the parameter ((($y_j$, $e_j$), $z_j$), ((y(j), e(j), m(j))) as his signature to an intended person (procedure (3) and arrow 204).

Step 4—Verifying the Signature

The verifier confirms the above equation (4) as well as the following equation (procedure (4) in FIG. 2):

$$e(j) = h(x_j^{y(j)} \cdot z_j^{e(j)} \bmod p, m(j)).$$

If the above is correct, the verifier can conclude that the signature for the message m(j) was signed by the signer who was specified by the specifier i.

Here, we explain the notion of public key certificates. A trusted user, called the certification authority (CA), makes a signature on a message indicating the public key or a user, the identity of the user, and all the validation date, etc. The digital signatures by CA are called "public key certificates." If one needs to confirm a public key of a user, then one can verify the authenticity by confirming the public key certificate by means of the public key of CA.

In this embodiment the digital signature made by the specifier on a (converted) public key of user is considered as a kind of public key certificate. The difference from the ordinary public key certificate is the anonymity of the certificate user. It will be appreciated that the signature (($y_j$, $e_j$), $z_j$) on $z_j$, which is converted from $v_j$ of the public key of the signer j, is called an anonymous public key certificate. The notion and precise description of anonymous public key certificates are set out later.

In this embodiment, each procedure of the signer, specifier and verifier will be carried out in the same apparatus which has a capability for operation and communication like a personal computer. Also, communications between the signer, the specifier and the verifier can be carried out by using a public database and a service for anonymous communication on a network such as the Internet.

The information communication system with digital signature of this embodiment will be carried out by the above described information processing apparatus which is capable of executing each of the above steps.

The network used with this embodiment does not have to be the Internet. A so called "intranet" can be used as well.

In this embodiment, the anonymous public key certificate may be sent directly from the specifier to the signer, so long as it is not necessary for each user to confirm the specifier's specification.

As mentioned above, since the information communication system of this embodiment does not need the public key of the signer, the anonymity of the signer can be maintained.

Also, since a plurality of communications between the verifier and signer are not required, the system can be implemented over a simple and less expensive network then that of MO system. Therefore the proposed system can be constructed at low cost.

In addition, since the number of communications and operations is decreased, it becomes easier for the user.

Second Embodiment

Figure 6:
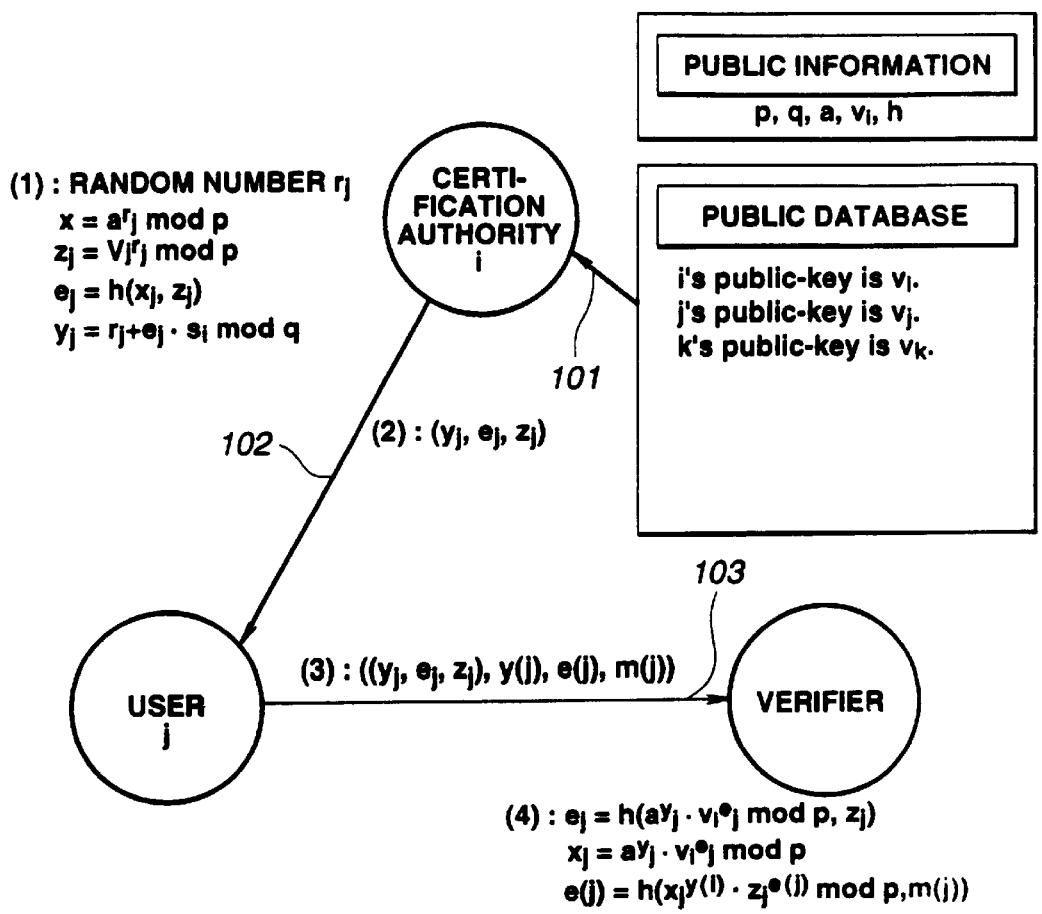
FIG. 6 is a block diagram showing another embodiment of the present invention.
Figure 7:
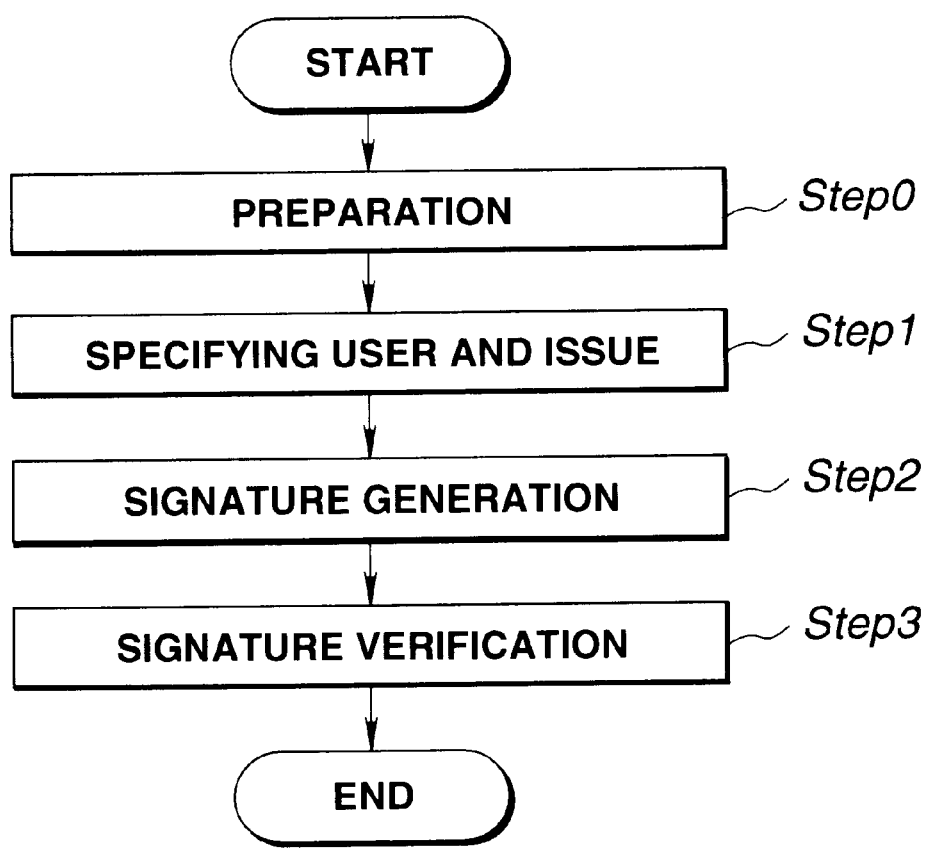
FIG. 7 is a flow chart for the embodiment of FIG. 6.

The second embodiment of this invention, which is shown in FIGS. 6 and 7, will now be described.

Those parts of this embodiment which are the same as in the first embodiment will be omitted from the following description.

Instead of the Schnorr signature scheme, the digital signature used in this embodiment will be ElGamal cryptography, which is described in "A Public Key Cryptosystem and a Signature Scheme Based on Discrete Logarithms" by T. E. ElGamal (*IEEE Transaction Theory*, vol. IT-31, no. 4, pp. 469–72, 1985).

Step 0—Preparation

This step is the same as step 0 of the first embodiment.

Step 1—Specifying a User

This step is the same as Step 1 of the first embodiment.

Step 2—Picking Up the Data

This step is the same as step 2 of the first embodiment.

Step 3—Generating the Signature

A signer j generates his signature for a message m(j) based on the following formulas. Also, the signer j selects a secret random number k(j) from Zq‡ and carries out the following equations:

$$r(j)=(x_j)^{\{k(j)\}} \bmod p;$$

and $$f(j)=\{m(j)+s_j \cdot r(j)\} \cdot k(j)^{-1} \bmod (p-1).$$

Next, the signer j sends the parameter $(((y_j,e_j),z_j), ((r(j), f(j)), m(j)))$ as his signature to a specified person.

Step 4—Verification of the Signature

The verifier confirms the above equation (4) and the following equation:

$$(x_j)^{\{m(j)\}} \equiv (z_j)^{\{r(j)\}} \cdot r(j)^{\{f(j)\}} \; (\bmod \; p)$$

If the above equation is correct, the verifier can conclude that the signature for the message m(j) was signed by a signer who was specified by the specifier i.

Third Embodiment

The third embodiment of this invention will be described next.

Those parts of this embodiment which are the same as the first embodiment will be omitted from the following description.

DSA, which is proposed as the standard of digital signature, and which is described in Bruce Schneier, "Applied Cryptography: Protocols, Algorithms, and Source Code", second edition, John Wiley & Sons, Inc., is used for the digital signature in this embodiment.

In this embodiment, $p,q,x_j,z_j$ are used as public key, and $s_j$ is used as secret key.

Step 0—Preparation

This step is the same as step 0 of the first embodiment.

Step 1—Specifying and Making Known the User

This step is the same as step 1 of the first embodiment.

Step 2—Picking Up the Data

This step is the same as step 2 of the first embodiment.

Step 3—Generation of the Signature

The signer makes his signature on a message m(j) based on the following formulas. The signer j selects a secret random number k(j) from Zq‡ and carries out the following equations:

$$r(j)=((x_j)^{\{k(j)\}} \bmod p) \bmod q;$$

and $$f(j)=k(j)^{\{-1\}} \cdot (h(m(j))-s_j \cdot r(j)) \bmod q.$$

Next, the signer j sends the parameter $(((y_j,e_j),z_j), ((r(j), f(j), m(j)))$ as his signature to a specified person.

Step 4—Verification of the Signature

The verifier confirms the above equation (4), 0<r(j)<q, 0<f(j)<q and the following equations:

$$w=f(j)^{-1} \bmod q;$$

$$u1=h(m(j)) \cdot w \bmod q;$$

$$u2=r(j) \cdot w \bmod q;$$

and $$v=((x_j)^{\{u1\}} \cdot (z_j)^{\{u2\}} \bmod p) \bmod q.$$

If the above equations are correct, the verifier can conclude that the signature on the message m(j) has been made by a signer who was specified by the specifier i.

Fourth Embodiment

The fourth embodiment of this invention will now be described.

Those parts of this embodiment which are the same as in the previous embodiment will be omitted from the following description.

In this embodiment, the above mentioned ElGamal cryptography is used for generating an anonymous public key certificate of $z_j$ instead of the Schnorr signature scheme.

Nevertheless, it should be noted that the following equations must be valid:

$$x_j=a_j^{\{r\}} \bmod p;$$

and $$z_j=(v_j)_j^{\{r\}} \bmod p.$$

More concretely, the specifier i selects a random number $r_j$ from $Z_q^*$ and carries out the following equations:

$$x_j=a_j^{\{r\}} \bmod p;$$

$$z_j=(v_j)_j^{\{r\}} \bmod p;$$

and $$f_j=(z_j+s_i \cdot x_j) \cdot (r_j)^{\{-1\}} \bmod (p-1).$$

Also in this embodiment, the parameter $((x_j, f_j), z_j)$ is the certification of the public key.

The authenticity of the anonymous public key certificate is proved by confirming the following equations:

$$a_j^{\{z\}} \equiv (v_i)_j^{\{x\}} \cdot (x_j)_j^{\{f\}} \; (\bmod \; p);$$

and $$z_j=(x_j)_j^{\{-s\}} \bmod p.$$

Fifth Embodiment

The fifth embodiment of this invention will be described next.

Those parts of this embodiment which are the same as in the previous embodiment will be omitted from the following description.

In this embodiment, the above described DSA is used for generating an anonymous public key certificate of $z_j$ instead of the Schnorr signature scheme and the ElGamal cryptography.

Nevertheless, it should be noted that the following equations are valid:

$$x_j=a_j^{\{r\}} \bmod p;$$

and $$z_j=(v_j)_j^{\{r\}} \bmod p.$$

More concretely, the specifier i selects a secret random number $r_j$ from $Z_q^*$ and carries out the following equations:

$$x_j=a_j^{\{r\}} \bmod p;$$

$$z_j=(v_j)_j^{\{r\}} \bmod p;$$

and $$f_j=(r_j)^{\{-1\}} \cdot (h(z_j)-s_i \cdot x_j) \bmod q.$$

Again in this embodiment, the parameter $((x_j, f_j), z_j)$ is the anonymous public key certificate.

The authenticity of certification of the public key will be proved by confirming $0<x_j<p$, $0<f_j<q$ and the following equations:

$$w=(f_j)^{\{-1\}} \bmod q;$$

$$u1=h(z_j)\cdot w \bmod q;$$

$$u2=x_j\cdot w \bmod q;$$

and $$v=a^{\{u1\}}\cdot(v_i)^{\{u2\}} \bmod p.$$

The authenticity of the anonymous public key certificate is proved by confirming the following equation:

$$z_j=(x_j)_j^{\{-s\}} \bmod p.$$

As described above, this invention provides a digital signature method which maintains the anonymity of the signer.

In a system using this invention, the number of communications is decreased; and correspondingly, the number of operations is also decreased.

This system can be utilized on a simple and inexpensive network which only requires maintaining anonymity with respect to one transmission of a message; and the system does not require an expensive network which requires maintaining anonymity with respect to many transmissions of message(s) from/to a user.

The Sixth Embodiment

The digital signature method of this embodiment is based on anonymous public key certificates. The method is used for group signatures. In this embodiment, the specifier is a trusted authority ZA, specified signers are members, and a digital signature based on an anonymous public key certificate is a group signature.

The anonymous public key certificates have the following features:

1. The certification authority (CA) converts, using a random number, the common public parameter and the public key of the certificate user. CA makes a signature on the converted public key.
2. Since the same relationship holds between the converted public key and the original public key with respect to the secret key, the certificate user can make a signature on a message using the anonymous public key certificates and the secret key.
3. The receiver who received the anonymous public key certificates and the signature by the certificate user can verify that the converted parameter and public key are certified by CA. Using the certified parameter and public key, the verifier also verify that the digital signature on the message is genuine.
4. We call the anonymous public key certificates by CA, together with the signature by the corresponding user, an anonymous signature because it is hard to identify the signer from the signature.

As mentioned above, the specifier is the authority ZA and the user who is specified by the specifier (i.e., the signer) is the member. Thus the public key of the specifier is the public key of the group, and the anonymous signature by the signer is the group signature.

Next, the method to reveal a signer will be described.

The authority ZA can record the relationship between the members and the certificate. Therefore, the authority ZA can identify the signer of a group signature.

On the other hand, it is possible to confirm whether or not a particular member is the signer by checking the equality of the secret key which is used for the group signature and the secret keys of each of the members. Accordingly, it is possible to obtain the identity of the signer by requesting the proof of inequality of each member. This is because it is possible to prove that the secret key of each member who is not the signer is different from the secret key which used for the group signature.

Anonymous public key certificates will now be described, followed by a description of the group signature with which it is utilized.

Anonymous Public Key Certificates

Anonymous public key certificates will be described with reference to FIGS. 6 and 7.

The system of anonymous public key certificates consists of a certification authority, a plurality of users, a certificate user who utilizes an anonymous public key certificate and a verifier who verifies the signature of the certificate user.

This system is utilized with a network over which identifying the sender or the receiver of communication is difficult. (In this specification, such a network will be called an "anonymous communication network".)

In FIG. 6, the term "Public Information" means a common database in the system and the term "Public Database" means an issued database. The arrows in FIG. 6 represent the sending, receiving and obtaining of data and the numbers enclosed in brackets represent steps in an order of procedure. The term "user" refers to the particular one of the users who utilizes an anonymous public key certificate. The term "verifier" refers to the person who verifies the signature made by the user.

Step 0—Preparation

At first, prime numbers p and q such that $q|(p-1)$, an element a of $Z_p^*$ of order q (i.e., $a^q\equiv 1(\bmod\ p)$) and a one-way hash function $h:Z_p\times Z\to\{0,\ldots,2^{(t-1)}\}$, are prepared. These numbers are registered and managed so that every user can access them and so that they cannot be changed.

The certification authority i generates a public key $v_i$ and a secret key $s_i(v_i=a_i^{\{-s\}} \bmod p)$ and registers the public key $v_i$ into the public database together with the identity. The user j, who can be a signer, generates a public key $v_j$ and a secret key $s_j(v_j=a_j^{\{-s\}} \bmod p)$; and registers the public key $v_j$ into a public database together with the identity. A plurality of users and signers can exist in this system.

Step 1—Issue of Certificate

The certification authority i specifies a user (signer) j, from the several users (arrow 101 in FIG. 12); and obtains $z_j$ which is converted from the public key $v_j$ of the signer j by using a random number. The certification authority then makes a signature on that, for example using the Schnorr signature scheme (procedure (1) in FIG. 1), and sends that signature to the user j (arrow 102 in FIG. 1).

More concretely, the certification authority i selects a secret random number r from $Z_q^*$ and obtains the following parameters by using the following equation, and registers the signature $((y_j, e_j, x_j), z_j)$:

$$x_j=a_j^{\{r\}} \bmod p;$$

$$z_j=(v_j)_j^{\{r\}} \bmod p;$$

$$e_j=h(x_j, z_j);$$

and $y_j = r_j + e_j \cdot s_i \mod p.$

Step 2—Generation of the Signature

The user j receives the signature $((y_j, e_j), z_j)$ and confirms the following equations:

$$e_j = h(a_j^{\{y\}} \cdot (v_i)_j^{\{e\}} \mod p, z_j) \qquad (6);$$

and $$z_j = (a_j^{\{y\}} \cdot (v_i)_j^{\{e\}} \mod p)_j^{\{-s\}} \mod p \qquad (7).$$

The user j makes his signature on the message m(j) based on the following formulas; and the user j selects a secret random number (j) and carries out the following equations:

$$x_j = a_j^{\{y\}} \cdot (v_i)_j^{\{e\}} \mod p;$$

$$x(j) = (x_j)^{\{r(j)\}} \mod p;$$

$$e(j) = h(x(j), m(j));$$

and $$y(j) = r(j) + e(j) \cdot s_j \mod q.$$

Figure 1:
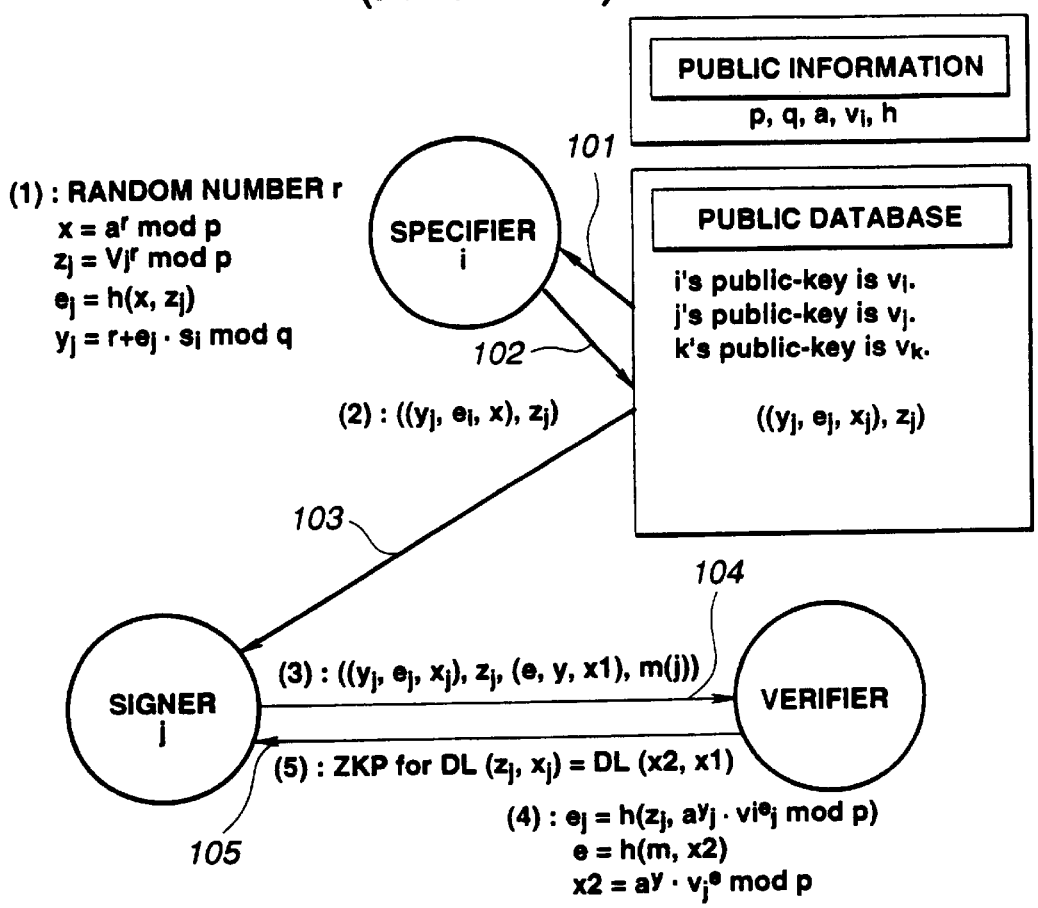
FIG. 1 is a block diagram showing the MO system.

Next the user j sends the parameter $((y_j, e_j), z_j), ((y(j), e(j)), m(j)))$ as his signature to an intended person (procedure (3) and arrow 103 in FIG. 1).

Step 3—Verification of the Signature

The verifier first confirms the above equation (6) and the following equation (procedure (4) in FIG. 1):

$$x_j = a_j^{\{y\}} \cdot (v_i)_j^{\{e\}} \mod p;$$

and $$e(j) = h((x_j)^{\{y(j)\}} \cdot (z_j)^{\{e(j)\}} \mod p, m(j)).$$

If the above is correct, the verifier can conclude that the signature on the message m(j) is that of a user j who received an anonymous public key certificate from the certification authority.

The above described anonymous public key certificates have following features:

(1) Only the certification authority can specify the user j, and the proof of specification is the certificate (digital signature generated by the certification authority i);
(2) The specified signer can anonymously generate the signature by using the certificate and the secret key of the signer;
(3) The receiver can confirm the authenticity of the anonymous signature by using the public key of the specifier i; and
(4) It will be very difficult to distinguish the signer j by use of the anonymous signature, and forgery of the anonymous signature is very difficult.

Group Signature Based on Anonymous Public Key Certificate

Figure 8:
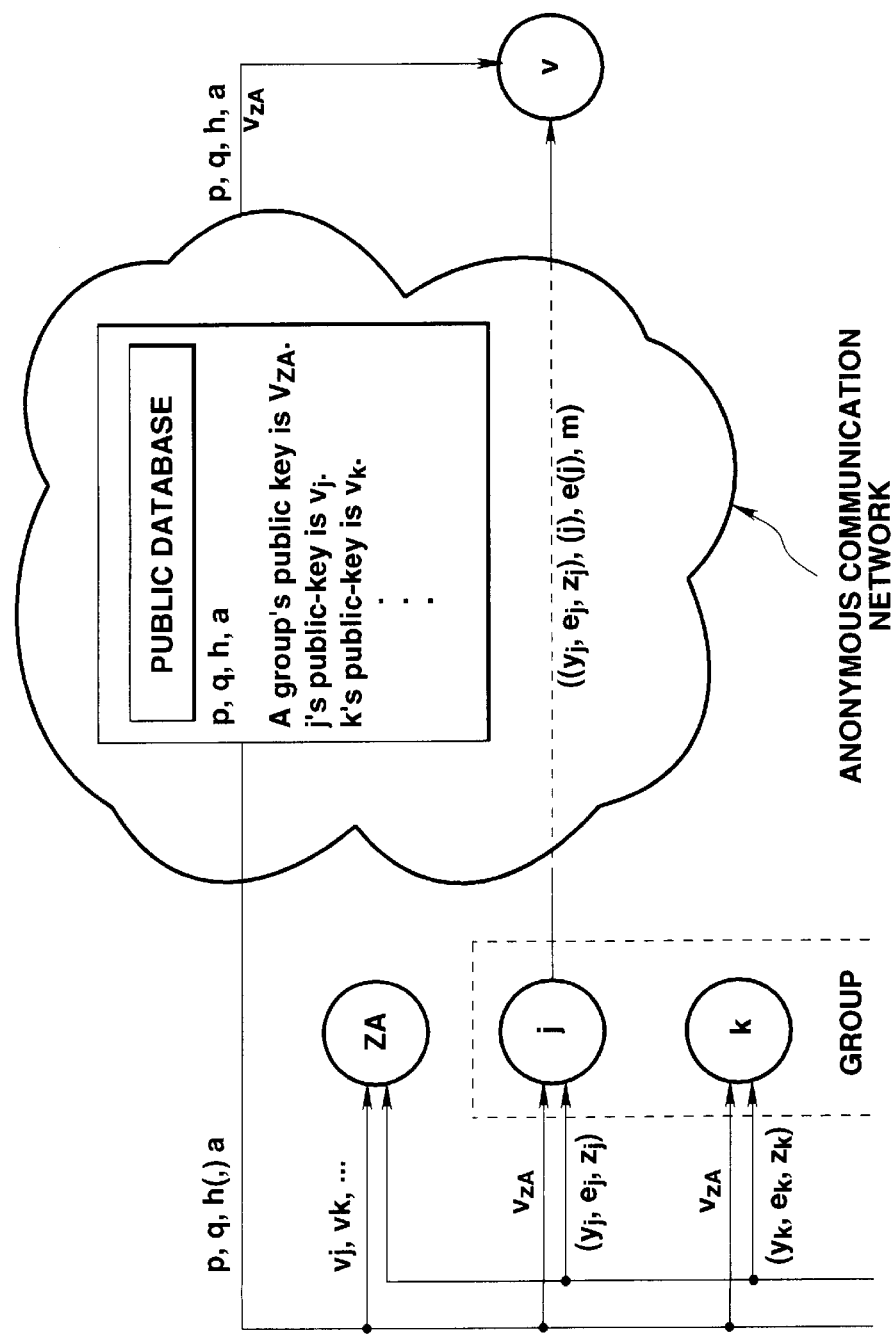
FIG. 8 is a block diagram showing a signature system according to the present invention.

The system of group signature based on anonymous public key certificate is shown in FIG. 8. In this system a plurality of users can anonymously communicate each other over an anonymous communication network.

In this system there is a public database which can be accessed by the trusted authority ZA and users j, k, v. The public keys of each of the users and the common parameter are registered with the database. This database is properly managed so as to prevent unfair action such as alteration.

In FIG. 8 the group public key is denoted as $v_{\{ZA\}}$. The group consists of members including users j and k. The users j, k, obtain anonymous public key certificates $(y_j, e_j, z_j)$ $(y_k, e_k, z_k)$ which are issued by the authority ZA, respectively, and they each generate a signature part (e.g., (y(j), e(j), m) for user j) based on their own anonymous public key certificates. The users send the group signature $((y_j, e_j, z_j), y(j), e(j), z(j))$ to another user v over the anonymous communication network.

The user v verifies the anonymous public key certificate $(y_j, e_j, z_j)$ by using the group public key $v_{\{ZA\}}$, and obtains certified values. The user v can confirm the authenticity of the group signature by verifying y(j), e(j), z(j) with these values.

Next a concrete embodiment will be described with reference to FIGS. 9 and 10.

Figure 9:
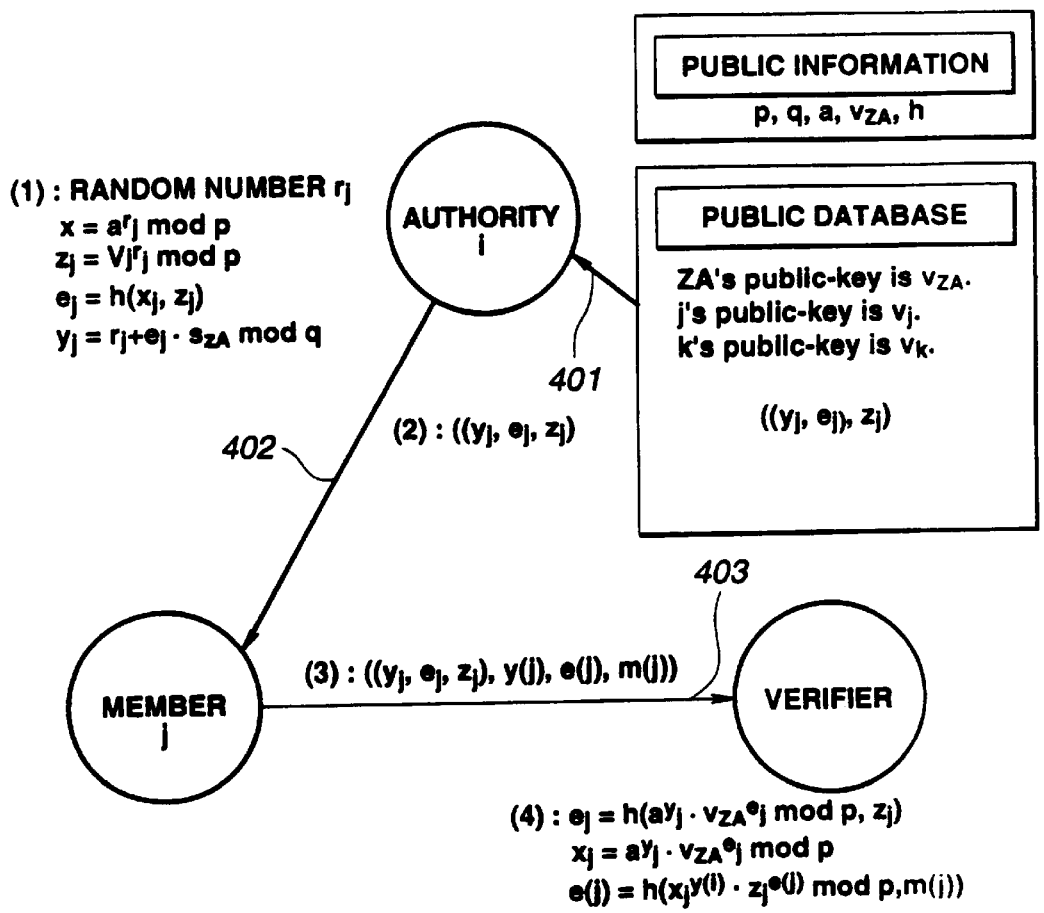
FIG. 9 is a block diagram showing a group signature system according to the present invention.

FIG. 9 shows the system which is applied to group signature based on anonymous public key certification.

Figure 10:
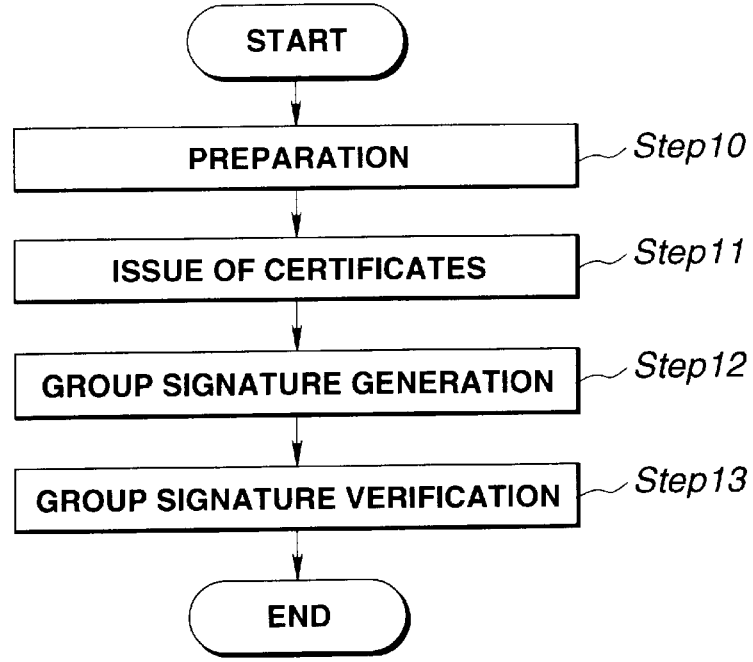
FIG. 10 is a flow chart for the system shown in FIG. 9.
Figure 11:
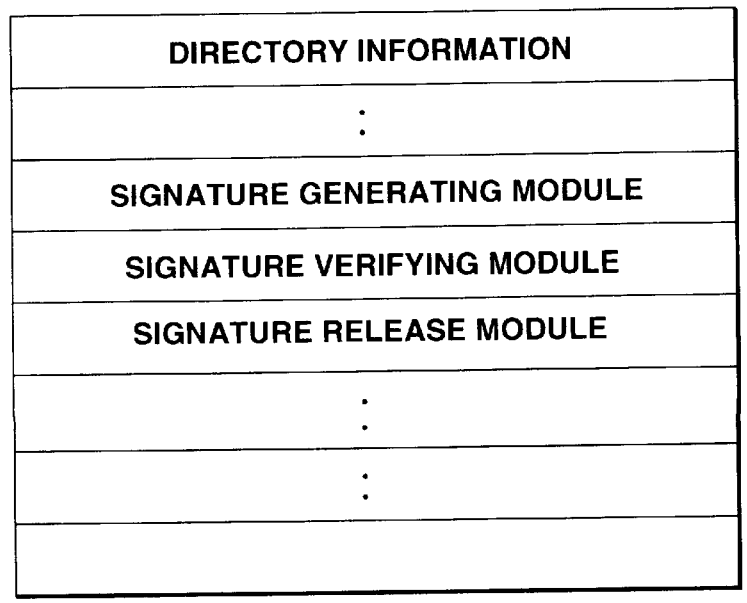
FIG. 11 is a memory map of the embodiment of FIG. 9.

FIG. 10 shows the flow chart of a procedure related to the method of group signature. FIGS. 11 and 12 are memory maps for the system of FIG. 9. In this system, the user j who receives an anonymous public key certificate from the authority ZA generates the group signature, and the verifier, who receives the group signature, confirms it as the group signature.

Step 0—Preparation

This is the same as Step 0 previously described.

Step 1—Issue of Certificates to Members

The authority authorizes the user as a member of the group; and obtains $z_j$ which is converted from the public key $v_j$ of the signer j by using a random number $r_j$. The authority also makes the signature using the Schnorr signature scheme (procedure (1) in FIG. 9) and sends the signature directly to the user j (procedure (2) and arrow 402 in FIG. 9).

In a concrete example, the authority ZA selects a secret random number r from $Z_q^*$ and obtains the following parameters by using the following equation, and sends the certificate $((y_j, z_j)$:

$$x_j = a_j^{\{r\}} \mod p;$$

$$z_j = (v_j)_j^{\{r\}} \mod p;$$

$$e_j = h(x_j, z_j);$$

and $$y_j = r_j + e_j \cdot s\{ZA\} \mod q.$$

Step 2—Generation of the Group Signature

The user j receives the signature $(y_j, e_j, z_j)$ and confirms the following equations:

$$e_j = h(a_j^{\{y\}} \cdot (v\{ZA\})_j^{\{e\}} \mod p, z_j) \qquad (8);$$

and $$z_j = (a_j^{\{y\}} \cdot (v\{ZA\})_j^{\{e\}} \mod p)_j^{\{-s\}} \mod p \qquad ().$$

The user (member) j makes his signature on the message m(j) based on the following formula; and then the user j selects a secret random number(j) and carries out the following equations given below.

Since $x_j = a_j^{\{y\}} \cdot (v\{ZA\})_j^{\{e\}} \mod p$ holds in the above equations, $a_j^{\{y\}} \cdot (v\{ZA\})_j^{\{e\}} \mod p$ will be denoted as $x_j$ in the following equations:

$$x(j) = (x_j)^{\{r(j)\}} \mod p;$$

$$e(j) = h(x(j), m(j));$$

and $y(j)=r(j)+e(j)\cdot s_j \mod q$.

Next, the signer j sends the parameter $((y_j, e_j, z_j), ((y(j), e(j)), m(j)))$ as his signature to an intended person (procedure (3) and arrow 403 in FIG. 9).

Step 3—Verification of the Signature

Figure 4:
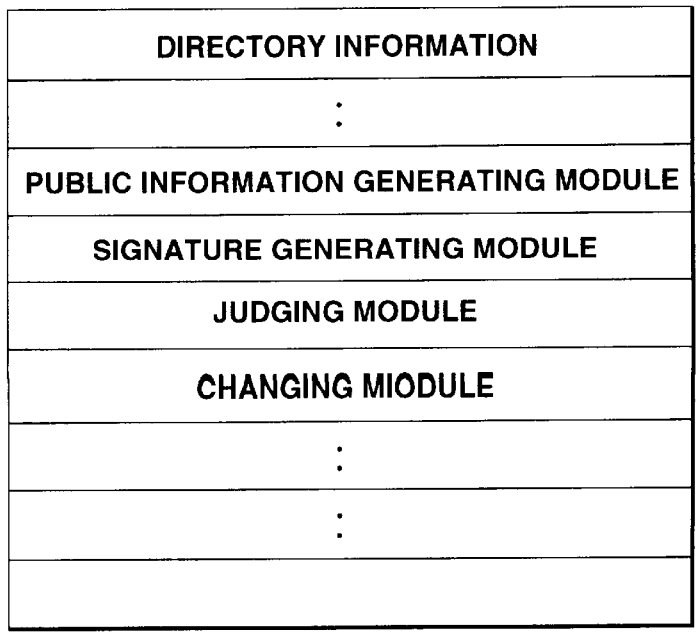
FIG. 4 is a memory map of the embodiment of FIG. 2.
Figure 5:
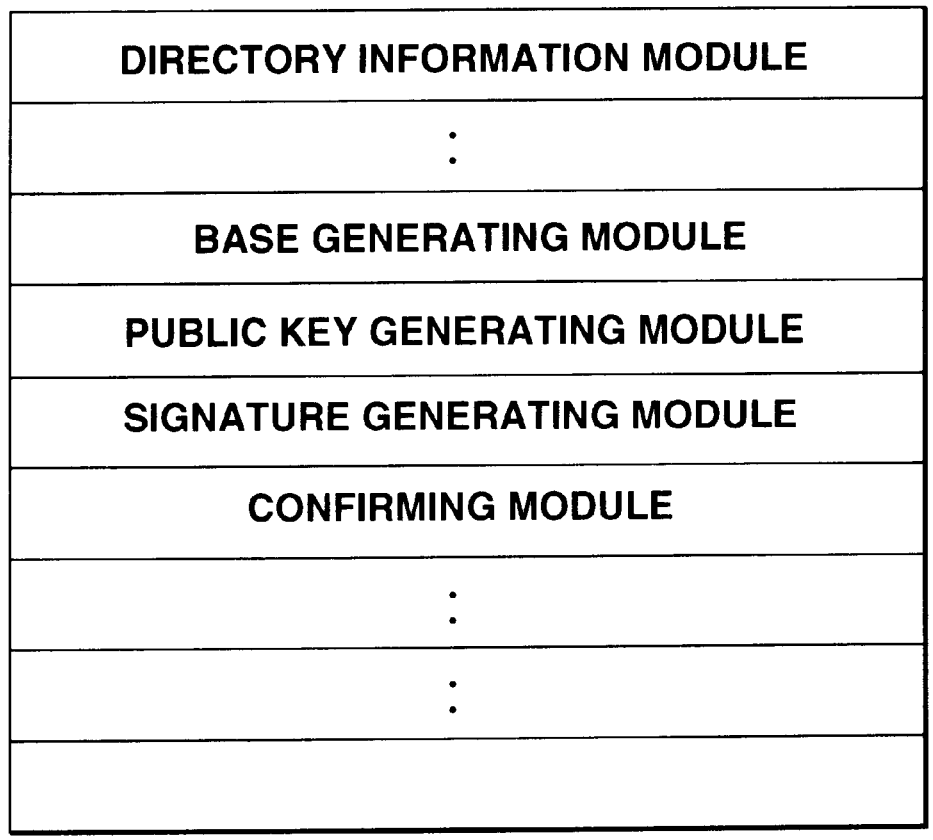
FIG. 5 is a second memory map of the embodiment of FIG. 2.

Firstly, the verifier confirms the above equation (8) and the following equation (procedure (4) in FIG. 4):

$$e(j)=h((x_j)^{\{y(j)\}}\cdot(z_j)^{\{e(j)\}} \mod p, m(j)).$$

If the above is correct, the verifier can conclude that the signature on message m(j) is the group signature signed by a member who is permitted by the authority.

Methods to Reveal the Signer of the Group Signature

Revealing the signer of the group signature will be realized by following two methods respectively. In the following description, the group signature is ( $(e_k, y_k, z_k)$, e(k), y(k), m), the signer is the user (member) k and the random number which corresponds to $z_k$ generated by the authority ZA is $r_k$.

Method 1—Revealing by the Authority

Because the authority can record the random number which is used for generating the certificate, the authority can also distinguish which member corresponds to $z_k$ in the certificate when a group signature was given. Therefore, the authority can recognize that the signer is member k, and that the random number is $r_k = \log_{vk} z_k$.

The authority proves that the secret key corresponding to the public key of the certifier is the secret key corresponding to the public key of the member. That is, the authority proves following equation by using Zero Knowledge Proof protocol for proving the equality of discrete logarithms:

$$\log_{vk} z_k = \log_a x_k.$$

In this equation, $x_k = a_k^{\{y\}}\cdot(v_i)_k^{\{e\}} \mod p$.

Also, the public key of the member is registered together with the identity on the public database.

Zero Knowledge Proof protocol for proving for $\log_{vk} z_k = \log_a x$ will be described next.
(1) The prover P sends $v_k$ to the verifier V.
(2) The verifier V selects random numbers r1 and r2 from $Z_q^*$ and carries out the equation $ch=(v_k)^{r1}\cdot a^{r2}$. The verifier V sends its result to the prover P.
(3) The prover P selects a random number t (from $Z_q^*$), and carries out the equations $h1=ch\cdot a^t$ and $h2=(h1)_k^{\{r\}}$. The prover P then sends the results to the verifier V.
(4) The verifier V sends (r1, r2) to the prover P.
(5) The prover P confirms $ch=(v_k)^{r1}\cdot a^{r2}$, and sends t to the verifier V.
(6) The verifier V confirms $h1=(v_k)^{r1}\cdot a^{\{r2+t\}}$ and $h2=(z_k)^{r1}\cdot(x_k)^{\{r2+t\}}$.

The above protocol is one example; and other protocols may also be used in carrying out a proof.

Method 2—Disavowal by Each of the Members

Another proof can be carried out, by means of which each member proves that the group signature to be examined was not generated by one of the members.

The member j (prover P) proves to the verifier V that the secret key corresponding to $z_k$ used for the group signature is different from the member's secret key $(s_j=\log_{xj} z_j)$ That is, the equation $(\log_a v_j \neq \log_{xk} z_k)$ is proven by using the following protocol PL.

The protocol PL is executed under the assumption that both the prover P and verifier V know p, q, a, $v_1$, $v_j$, $z_k$ and $x_k=a_k^{\{y\}}\cdot(v_k)_k^{\{e\}} \mod p$ and have agreed on a parameter d.

In this protocol PL, BC(r, R) is referred to as the bit-commitment to bit r using random input R.

If someone selects 0 or 1, and computes the bit-commitment with a random input R and sends the commitment to another person, then that other person can not know which is selected (0 or 1) unless the other person obtains the random number R. Once a bit is committed, the commitment can not be changed. An example of this is described in an article entitled "Practical and Provably Secure Release of a Secret and Exchange of a Signature" by I. B. Damgard, Proc. of EUROCRYPT 93, pp. 207–17 (1994).

Zero knowledge proof protocol for proving $\log_a v_j \neq \log_{xk} z_k$ will be described next.

In the following description, "mod p" will be omitted at times, to simplify the equations; however, one skilled in the art will understand that modular arithmetic is used, where it is used.
(1) The verifier V selects a random number e (from $Z_q^*$) and B from $\{0, 1\}$, carries out the following equations:

if B=0, $(r1,r2)=(a^e, (v_j)^e)$;

and if B=1, $(r1,r2)=((x_k)^e, (z_k)^e)$.

The result of this operation is then sent to the prover p.
(2) The prover P confirms whether $r1^{\{sj\}}=r2 \pmod p$ is invalid or not. If it is invalid, then r is 1. On the other hand, if it is valid, then r is 0. Accordingly, the prover P sends $g=BC(r,R)$ to the verifier V.
(3) The verifier V sends e to the prover P.
(4) The prover P confirms that $(r1,r2)=(a^e, (v_j)^e)$ or $(r1,r2)=((x_k)^e, (z_k)^e)$. If neither is invalid, the prover P makes ans=stop. If either is valid then ans=R. Then the prover P sends the ans to the verifier V.
(5) If ans=stop, the verifier V quits the protocol. If ans=R, the verifier V confirms that BC(B,R)=g.
(6) The procedure (1)–(5) is repeated d times.

The above-described protocol is only one example; and other protocols may also be used to establish the proof.

The receiver who has the group signature to be examined may use either method 1 or method 2 at his option. Initially, the receiver may use method 1 automatically, and then use method 2 if the authority does not execute method 1 well. Alternatively, the receiver may initially use method 2, and then use method 1 if any problem occurs (for example, the receiver can not contact with any members).

If there are a plurality of groups, a plurality of authorities corresponding, respectively, to each group may be established. Also, one authority may represent all groups. In any case, the above method will be able to carry out the group signature method.

In the above described embodiment, the authority, the specifier, the verifier, the group member and the receiver will be able to carry out the above procedures on any apparatus, such as a personal computer, which is capable of processing information and which is capable of communicating. Also, communications among the signer, the specifier, the authority, the member, the verifier, and the receiver may be carried out by using the service of an anonymous communication system such as the Internet.

An information communication system having a digital signature according to this embodiment employs an information operating apparatus, as above described, for carrying out each of the above steps, and a communication network. In this embodiment, the network is not limited to the Internet; a so-called intranet can be used in place of the Internet.

Also in this embodiment, the anonymous public key certificate is sent by the authority directly to the member. In other situations, the receiver and the member may access the public database in which the certificate is registered.

As mentioned above, this embodiment makes use of the new group signature system in which each member can prove whether or not the signature being used is their own signature.

Furthermore, in this system, the data length of the group's public key is not proportional to number of members. For example, on the assumption that a prime number is 688 bits, a security parameter t of a one way hash function is 70 bits and the public key size of the group signature (according to Park) is 1676 bits. On the other hand, the public key size of the above described embodiment for the same group is 1108 bits (about 34% decrease from Park's data size).

Therefore, a system based on this embodiment can be used at low cost, since there is a reduction of the amount of data to be dealt with as well as flexibility for revealing the signer.

In this embodiment, the authority can reveal the signer of the signature; and each member can prove disavowal. Therefore, if one of them does not work well, the remainder can be available to reveal the signer of the signature. So as a whole, the system based on this embodiment will be convenient for use, and will be flexible.

Furthermore, it is easy to add a new member to the group; and accordingly it is easy to manage the system.

The Seventh Embodiment

The seventh embodiment will now be described. A description of those parts of this embodiment which are the same as in the previous embodiment will be omitted.

In the previous embodiment, the anonymous public key certificate corresponding to $z_j$ was generated based on the Schnorr signature scheme. And $p, q, x_j, z_j$ was public key, $s_j$ was secret key and the Schnorr signature scheme was applied to the message $m(j)$.

However, in this embodiment, ElGamal Cryptography, instead of the Schnorr signature scheme, will be applied to the message $m(j)$.

The features of this embodiment which are different from those of the previous embodiment are described below.

Step 2—Generation of the Group Signature

The signer j makes his signature on a message $m(j)$ based on the following formula; and he selects a secret random number $k(j)$ from $Z_p^*$ according to the following equations:

$$r(j)=(x_j)^{\{k(j)\}} \bmod p;$$

and $$f(j)=(h(m(j))+s_j \cdot r(j)) \cdot k(j)^{\{-1\}} \bmod (p-1).$$

Next, the signer j sends the parameter $((y_j, e_j), z_j, r(j), f(j), m(j))$ as his signature to an intended person.

Step 3—Verification of the Signature

The verifier confirms the following equations in order:

$$e_j=h(a_j^{\{y\}} \cdot (v\{ZA\})_j^{\{e\}} \bmod p, z_j);$$

and $$(x_j)^{(h(M(j))} = (z_j)^{\{r(j)\}} \cdot r(j)^{(f(j))} \pmod{p}.$$

If the above is correct, the verifier can conclude that the signature for the message $m(j)$ was signed by the signer j.

The Eighth Embodiment

The eighth embodiment will be described next. In the following, a description of those parts of this embodiment which are the same as in the previous embodiment will be omitted.

In the previous embodiment, the anonymous public key certificate of $z_j$ was generated based on the Schnorr signature scheme or ElGamal cryptography; and the Schnorr signature scheme or ElGamal cryptography was applied to the message $m(j)$.

However, in this embodiment, DSA (Digital Signature Algorithm), which is proposed as the digital signature standard at NIST (National Institute of Standard and Technology), is used for the message $m(j)$.

In this embodiment, $p, q, x_j, z_j$ represent the public key and $s_j$ represents the secret key.

Step 2—Generation of the Group Signature

The signer j makes his signature on a message $m(j)$ based on the following formula; and the signer j selects a secret random number $k(j)$ from $Zq\ddagger$ and carries out the following equations:

$$r(j)=((x_j)^{\{k(j)\}} \bmod p) \bmod q;$$

and $$f(j)=(k(j))^{\{-1\}} \cdot (h(m(j))-s_j \cdot r(j))) \bmod q.$$

Next, the signer j sends the parameter $((y_j, e_j), z_j), (r(j), f(j), m(j)))$ as his signature to a predetermined person.

Step 3—Verification of the Signature

The verifier confirms the following equation:

$$e_j=h(a_j^{\{y\}} \cdot (v_{ZA})_j^{\{e\}} \bmod p, z_j).$$

Then, the verifier confirms $0<r(j)<q$ and $0<f(j)<q$, and carries out the following equations:

$$w=(f(j))^{\{-1\}} \bmod q;$$

$$u1=h(m(j)) \cdot w \bmod q;$$

$$u2=r(j) \cdot w \bmod q;$$

and $$v=((x_j)^{\{u1\}} \cdot (z_j)^{\{u2\}} \bmod p) \bmod q;$$

and the verifier confirms $v=r(j)$. If the above equations are correct, the receiver can conclude that the signature for the message $m(j)$ was signed by the member who was permitted by the authority.

The Ninth Embodiment

The ninth embodiment of this invention is described below.

A description of those parts of this embodiment which are the same as in the previous embodiment, is omitted.

In this embodiment, the above mentioned ElGamal cryptography is used to generating an anonymous public key certificate of $z_j$ instead of the Schnorr signature scheme.

Nevertheless, it should be noted that the following equations are valid:

$$x_j=a_j^{\{r\}} \bmod p;$$

and $$z_j=(v_j)_j^{\{r\}} \bmod p.$$

Step 1—Issue of Certificates to Members

In a concrete example, the authority selects a secret random number $r_j$ from $Z_q^*$ for the member and carries out the following equations:

$x_j = a_j^{\{r\}} \mod p;$ $z_j = (v_j)_j^{\{r\}} \mod p;$ and $f_j = (z_j + s_{ZA} \cdot x_j) \cdot (r_j)^{\{-3\}} \mod (p-1).$ In this embodiment, the parameter ($x_j$, $f_j$, $z_j$) is the certificate of the public key.

Step 2—Verification of the Certification

The right of the certification of public key is proved by confirming the following equations:

$a_j^{\{z\}} = (v_{ZA})_j^{\{x\}} \cdot (x_j)_j^{\{f\}} \pmod p;$ and $z_j = (x_j)_j^{\{-s\}} \mod p.$

The Tenth Embodiment

The tenth embodiment of this invention is described below.

A description of those parts of this embodiment which are the same as in the previous embodiment, is omitted.

In this embodiment, above mentioned DSA is used for generating a certificate of a public key for $z_t$ instead of the Schnorr signature scheme and ElGamal cryptography methods.

Nevertheless, it should be noted that the following equations are valid:

$x_j = a_j^{\{r\}} \mod p;$ and $z_j = (v_j)_j^{\{r\}} \mod p.$

Step 1—Issue of Certificates to Members

In a concrete example, the authority selects a secret random number $r_j$ from Zq‡ for the member j and carries out the following equations:

$x_j = a_j^{\{r\}} \mod p;$ $z_j = (v_j)_j^{\{r\}} \mod p;$ and $f_j = (r_j)^{\{-1\}} \cdot (h(z_j) - s_j \cdot x_j) \mod q.$ Also, in this embodiment, the parameter ($x_j$, $s_j$, $z_j$) is the certificate of the public key.

Step 12—Verification

The authenticity of the certification of the public key is verified by confirming $0 < x_j < p$, $0 < f_j < q$ and the following equations:

$w = (f_j)^{\{-1\}} \mod q;$ $u1 = h(z_j) \cdot w \mod q;$ $u2 = x_j \cdot w \mod q;$ and $v = a^{\{u1\}} \cdot (v_{ZA})^{\{u2\}} \mod p,$ and $v = x_j$ is confirmed.

The authenticity of certificate of public key is verified by confirming the following equation:

$z_j = (x_j)_j^{\{-s\}} \mod p.$

Another Embodiment

This invention can be used not only for a system which is comprised of several kinds of apparatuses, for example, a host computer, a reader, a printer and an interface, but also an apparatus such as a fax machine or a copying machine, etc.

In the previously described embodiments, each step for a process may be executed by a software program stored in some medium such as a floppy disk, a hard disk, an optical disc, a magnetic optical disc, a CD-ROM, a CD-R, a magnetic tape, a non-volatile memory, a ROM, etc.

In such a case, the information of at least the issued information generating module, the signature generating module, the recognition module, the changing module, or base generating module, the public key generating module, the signature generating module and the confirmation module is stored in a medium shown as FIGS. 11 and 12.

An apparatus, such as a computer, reads out the software program from the medium and executes steps based on the software program or the software program within the operating system of the apparatus.

Moreover, the software program which is read out from the medium, may be written in the memory of an expansion card or an expansion unit connected with the computer. In such case, the CPU of the expansion card or the expansion unit may execute the above mentioned steps based on the software program.

As seen from the above, this embodiment employs the group signature method as well as the new group signature system based on the group signature method in which the data length of the public key of the group is not linear in relation to the number of members. Therefore, a system based on the embodiment is convenient, and is of minimal cost, because the size of the data to be dealt with is reduced and because the system achieves flexibility for revealing the signer.

In this embodiment, the authority can reveal the signer of the signature; and each member can prove disavowal. Thus, as a whole, a system based on this embodiment is convenient and flexible. Furthermore, this embodiment permits a group signature and a new group signature system based on the group signature method in which it is easy to add a new member to the group. Therefore, management of this system is easy.

What is claimed is:

1. A digital signature method comprising:
   (a) a first step for generating public information based on a common public parameter and an uncommon secret parameter;
   (b) a second step for converting the common public parameter and the public information for use in obtaining a signature for a message;
   (c) a third step for generating the signature, based on the common public parameter and the uncommon secret parameter; and
   (d) a fourth step for confirming the relationship between the signature and the message based on the converted public information and the converted common public parameter, wherein the secret parameter is not calculated from the common public parameter and the public information.

2. A digital signature method according to claim 1, wherein the common public parameter in said third step is the common public parameter which is converted in said second step.

3. A digital signature method according to claim 1, wherein the common public parameter and the public information in said third step are the common public parameter and the public information, which are converted in said second step.

4. A digital signature method comprising:
   (a) a first step for generating public information based on a common public parameter and an uncommon secret parameter:
   (b) a second step for converting the common public parameter and the public information for use in obtaining a signature for a message;
   (c) a third step for generating the signature, based on the common public parameter and the uncommon secret parameter: and
   (d) a fourth step for confirming the relationship between the signature and the message based on the converted public information and the converted common public parameter, wherein said second step further comprises converting the common public parameter and the public information into a new common public parameter and new public information, and wherein said third step is performed based on the new common public parameter, the new public information and the uncommon secret parameter.

5. An information communication system comprising:
   (a) means for generating a first digital signature based on a first digital signature method:
   (b) means for generating a second digital signature by using said first digital signature based on a second digital signature method; and
   (c) a means for confirming the authenticity of said second digital signature by using said first digital signature and said second digital signature,
   wherein said first digital signature generating means functions to specify one of said generating means as said second generating means by generating said first digital signature, and
   wherein said confirming means operates to confirm whether said second digital signature is generated by said second generating means as specified by said first digital signature.

6. A computer readable memory having following program codes:
   (a) a first program code for generating public information based on a common public parameter and an uncommon secret parameter;
   (b) a second program code for converting the common public parameter and public information;
   (c) a third program code for generating a signature for a message, based on the common public parameter, the public information, and the uncommon secret parameter; and
   (d) a fourth program code for confirming the relationship between the signature and the message based on the converted public information and the converted common public parameter, wherein the secret parameter is not calculated from the common public parameter and the public information.

7. A computer readable memory according to claim 6, wherein said second program code is further for converting the common public parameter and the public information into a new common public parameter and new public information, and wherein said third program code is further for generating the signature based on the new common public parameter, the new public information and the uncommon secret parameter.

* * * * *

UNITED STATES PATENT AND TRADEMARK OFFICE
CERTIFICATE OF CORRECTION

PATENT NO. : 6,154,841
DATED : November 28, 2000
INVENTOR(S) : Kazuomi Oishi

It is certified that error appears in the above-identified patent and that said Letters Patent is hereby corrected as shown below:

Sheet 10 of 10,
Figure 12, "PUBLIE" should read -- PUBLIC --.

Column 2,
Line 29, ""IRSA" should read -- "RSA --.

Column 3,
Line 1, "nay" should read -- any --;
Line 29, "the order" should read -- The order --; and
Line 54, "$Z_j$)" should read -- $Z_j$): --.

Column 4,
Line 1, "mod p, $Z_j$)" should read -- mod p, $Z_j$); -- and
Line 15, "can not" should read -- cannot --.

Column 7,
Line 1, "by group" should read -- by a group --;
Line 9, "by group" should read -- by a group --; and
Line 57, "user, a" should read -- user; a --.

Column 9,
Line 29, "following" should read -- the following --; and
Line 45, "can not" should read -- cannot --.

Column 10,
Line 33, "so called" should read -- so-called --; and
Line 44, "then" should read -- than --.

Column 12,
Line 33, "$a_j^{\{z\}} \equiv (v_i)_j^{\{x\}} \cdot (x_j)_j^{\{f\}}$ (mod p); should read -- $a_j^{\{z\}} \equiv (v_i)_J^{\{x\}} \cdot (x_j)_j^{\{f\}}$ (mod p); --.

UNITED STATES PATENT AND TRADEMARK OFFICE
CERTIFICATE OF CORRECTION

PATENT NO.   : 6,154,841
DATED        : November 28, 2000
INVENTOR(S)  : Kazuomi Oishi It is certified that error appears in the above-identified patent and that said Letters Patent is hereby corrected as shown below:

Column 13,
Line 53, "verify" should read -- can verify --.

Column 15,
Line 40, "following" should read -- the following --; and
Line 58, "each" should read -- with each --.

Column 16,
Line 36, "(($Y_j$, $Z_i$):" should read -- ($Y_j$, $Z_i$): --; and
Line 54, "mod p ... ( ) ." should read -- mod p ... (9) . --.

Column 17,
Line 17, "following" should read -- the following --;
Line 32, "following" should read -- the following --; and
Line 66, "$V_1$," should read -- $V_i$, --

Column 18,
Line 5, "can not" should read -- cannot --;
Line 8, "can not" should read -- cannot --;
Line 25, "prover p." should read -- prover P. --; and
Line 46, "can not" should read -- cannot --.

Column 19,
Line 59, "$(X_j)^{(h(M(j))} \equiv (Z_j)$" should read -- $(Xj)^{(h(m(j))} \equiv (Z_j)$ --.

Column 20,
Line 53, "generating" should read -- generate --.

UNITED STATES PATENT AND TRADEMARK OFFICE
CERTIFICATE OF CORRECTION

PATENT NO. : 6,154,841
DATED : November 28, 2000
INVENTOR(S) : Kazuomi Oishi

It is certified that error appears in the above-identified patent and that said Letters Patent is hereby corrected as shown below:

<u>Column 24,</u>
Line 10, "following" should read -- the following --.

Signed and Sealed this

Twelfth Day of February, 2002

JAMES E. ROGAN
*Director of the United States Patent and Trademark Office*